Jan. 27, 1925.  1,524,496
T. YAMAMOTO ET AL
ALTERNATING CURRENT MOTOR
Filed June 23, 1922
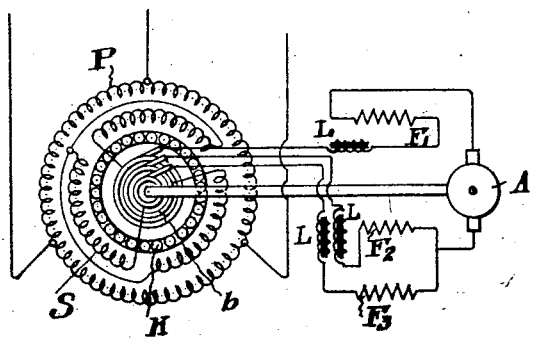
Inventors:
Tadaoki Yamamoto
and Masataro Kawarada
By Attys
Fraser, Jurk & Myers Patented Jan. 27, 1925.

1,524,496

UNITED STATES PATENT OFFICE.

TADAOKI YAMAMOTO, OF TAKATA-MACHI, TOKYO, AND MASATARO KAWARADA, OF NIPPORI-CHO, TOKYO, JAPAN.

ALTERNATING-CURRENT MOTOR.

Application filed June 23, 1922. Serial No. 570,305.

*To all whom it may concern:*

Be it known that we, TADAOKI YAMAMOTO and MASATARO KAWARADA, both subjects of the Emperor of Japan, residing at 1421 Takata, Takata-machi, county of Kitatoyoshima, Prefecture of Tokyo, Japan, and 1132 Yanakamoto, Nippori-cho, county of Kitatoyoshima, Prefecture of Tokyo, Japan, have invented certain new and useful Improvements in Alternating-Current Motors; and we do declare the following to be a clear, full, and exact description of the same, reference being had to the accompanying drawings, and to the characters of reference marked thereon, which form a part of this specification.

In the previous application of T. Yamamoto and M. Kawarada, Serial No. 485,196 filed July 16th, 1921, an electrical machine was described which had the characteristic property of starting by itself, exciting by itself and synchronizing by itself when the said machine was connected to the line.

This machine comprised an induction motor and a series commutator generator connected in cascade therewith, the said machine operating in such a manner that when alternating current power is supplied to the aggregate at the induction motor side, the aggregate will start by itself, excite by itself and step into synchronism by itself.

The present invention relates to the construction of an improved apparatus based upon the same principle as that of the previous application and comprises in combination a high reactance placed in the secondary circuit, between the said induction motor and the said series generator, and a squirrel cage winding of high resistance provided on the secondary core.

The principal object of the invention is to produce a synchronous motor which will start by itself, excite by itself and synchronize itself without any manual operation of any part of the device or attached therewith, but by a mere throwing-in of a main switch.

A further object is to retard the building up of the exciting current in the secondary circuit and so adjust the time of synchronization of the aggregate to the right moment.

A still further object is to prevent the hunting at synchronization.

A still further object is to produce a motor in which the torque is at its maximum value for the whole range of acceleration, that is to say, from the instant of starting to the time at which it is about to synchronize.

A still further object is to produce a very simple and inexpensive device, and yet one which will be extremely efficient for the purpose for which it is designed.

The foregoing objects we accomplish by means of such structure and relative arrangement of the parts as will fully appear by a perusal of the following specification and claims.

In the annexed drawing is illustrated one form of the invention.

Referring now more particularly to the characters of reference on the drawing, the invention consists of an induction motor comprising a primary winding P, a secondary winding S, a squirrel cage winding K, and a series commutator generator comprising a field winding $F_1$ and an armature A, the induction motor and the series commutator generator being connected in cascade through the slip rings $b$ and the suitable reactors L and being preferably connected mechanically directly to each other.

In an aggregate formed in this manner if an alternating current is supplied to it on the induction motor side, the aggregate will start as an ordinary induction motor, the series wound machine which is connected in series with the secondary winding of the induction motor serving only as an external secondary resistance connected to the secondary circuit. As the aggregate is started and gains in speed the secondary frequency will diminish and when it goes down to a certain sufficiently low value, the magnetic field of the series generator will be established in one or the other direction according to the circumstances, and from this time on the series wound machine will operate as a direct current series generator supplying a direct current to the secondary winding of the induction machine. This current flowing in the secondary winding produces a stationary magnetic field along the periphery of the rotor core and thus the rotor will be attracted by the rotating field produced by the stator winding and in this manner the aggregate will be synchronized automatically. After this the aggregate will continue to run as a self-exciting synchronous motor, the direct connected series generator serving as the exciter, all of this has been fully explained in the said application referred to in the above.

As has been stated hereinbefore, the present invention is characterized by the provision in the combination of a high resistance squirrel cage winding K on the secondary core of the induction motor and a high reactance L placed in the secondary circuit. The provision of the high resistance squirrel cage winding K on the secondary core will serve to allow the motor to start with a high torque, while the provision of a high reactance L will effectively limit the rush of current at starting. As the aggregate speeds up and the frequency of the secondary current diminishes, more and more current will flow in the secondary winding and the torque resulting therefrom will gradually increase, having in effect to compensate the gradually diminishing torque due to the squirrel cage winding, which decrease owing to its falling speed torque characteristic. When the aggregate finally steps into synchronism, the high resistance squirrel cage winding provided on the secondary core will produce no effect at all inasmuch as it rotates with the same angular velocity as that of the rotating field produced by the primary currents, and also the high reactance placed in the secondary circuit will produce no effect at all since a direct current flows in this circuit as long as the aggregate runs at the synchronous speed.

Thus it will be seen that the combination of the high resistance squirrel cage winding K and the high reactance L acts in a selective manner in that at starting it is the former that acts primarily while it is the latter that acts primarily at a higher speed which is, however, lower than the synchronous speed. In this manner the machine is rendered entirely automatic with respect to its starting and synchronizing operations. No manipulation such as the controlling of a starting rheostat is necessary.

After the aggregate has stepped into synchronism both the squirrel cage winding K and the reactance L are automatically put out of commission. This automatic action is entirely of an electrical nature.

The provision of the high reactance L in the secondary circuit will have the effect of limiting the secondary current and consequently of retarding the establishment of the magnetic field in the series generator until such time as the aggregate has sufficiently gained in its speed and the secondary frequency has diminished to a sufficiently low value. By this, the magnetic field of the series generator will be established at the right moment, and consequently the synchronization will be carried on smoothly without the slightest tendency of hunting. To limit the starting current to an amount comparable with the full load current, the magnitude of the reactances L must be approximately four or five times that of the total windings proper.

From all that has been stated it will be seen that we have accomplished by an exceedingly simple means an electric motor which starts by itself, excites itself and synchronizes by itself without a single manipulation of any part connected therewith in any way but by simply throwing the main switch on to the line.

If desired, the field winding of the series generator may be divided into two parts $F_2$ and $F_3$ connected in parallel instead of a single winding $F_1$ or it may be divided into three parts $F_1$, $F_2$ and $F_3$ as shown in the figure.

In case reactor L is composed of a conductor of a sufficiently high resistivity and is constructed in such a manner that the number of its turns is adjustable, it can be employed as well for the regulation of the exciting current after the aggregate has stepped into synchronism.

While we have shown, by way of example, only one embodiment of the invention, there may be other modifications. For example the reactor L may be placed inside one of the machines instead of placing it separately in the secondary circuit or it may even be a part of the secondary winding S or the field windings $F_1$, $F_2$ and $F_3$ or the armature A.

What we claim is:—

1. An alternating current motor comprising in combination, an induction motor, a series generator mechanically connected with the said motor, a reactor connected between the secondary winding of the said motor and the said generator, a high resistance squirrel cage winding provided on the said motor, the said reactor being of such a high inductance as to limit the starting current of the motor to a magnitude nearly equal to the normal full load current.

2. An alternating current motor comprising in combination an induction motor, a series generator mechanically connected with the said motor, a reactor connected between the secondary winding of the said motor and the said generator, a high resistance squirrel cage winding provided on the said motor, the said reactor being formed in three sections and of such a high inductance as to limit the starting current of the motor to a magnitude nearly equal to the normal full load current, and the field winding of the said generator being divided into three sections, each of which is connected to one of the secondary terminals of the motor through one of the sections of the said reactor, and two of the said sections of the said field winding being in parallel and connected to one of the terminals of the armature of the said generator.

In witness whereof, we have hereunto signed our names in the presence of two subscribing witnesses.

TADAOKI YAMAMOTO.
MASATARO KAWARADA.

Witnesses:
HIDEO KAI,
JAMES ORR DENBY.